United States Patent
Kaser

[15] 3,673,653
[45] July 4, 1972

[54] CHIP DEFORMER AND BREAKER FOR USE WITH METAL CUTTING TOOL

[72] Inventor: Alfred Kaser, Rieden/Baden, Switzerland

[73] Assignee: Aktiengesellschaft Brown, Boveri & Cie, Baden, Switzerland

[22] Filed: May 13, 1970

[21] Appl. No.: 36,984

[30] Foreign Application Priority Data

June 3, 1969 Switzerland ..........................8394/69

[52] U.S. Cl. ...............................................29/96, 29/105
[51] Int. Cl. ..............................................B26d 1/00
[58] Field of Search ..................................29/96, 105

[56] References Cited

UNITED STATES PATENTS

| | | |
|---|---|---|
| 3,191,262 | 6/1965 | Gustafson..................................29/96 |
| 3,171,188 | 3/1965 | Stier..........................................29/96 |
| 2,897,580 | 4/1959 | Huber........................................29/96 |
| 2,860,402 | 11/1958 | Proksa.......................................29/96 |
| 1,854,672 | 4/1932 | Robinson et al. ........................29/96 X |
| 3,364,544 | 1/1968 | Urbanic.....................................29/96 |
| 3,331,116 | 7/1967 | Fussenhauser et al....................29/96 |
| 3,381,349 | 5/1968 | Newcomer.................................29/96 |
| 3,172,190 | 3/1965 | Beach........................................29/96 |
| 3,052,952 | 9/1962 | Bader et al................................29/96 |
| 2,955,349 | 10/1960 | York..........................................29/96 |

Primary Examiner—Harrison L. Hinson
Attorney—Pierce, Scheffler & Parker

[57] ABSTRACT

A chip breaker for deforming and breaking chips cut by a metal tool includes at least one deflecting surface for the chips constituted by a series of plane surface elements and which may also include at least one curved surface element.

5 Claims, 4 Drawing Figures

Inventor
Alfred Kaser

By Pierce, Scheffler & Parker
Attorneys

Inventor
Alfred Käser

CHIP DEFORMER AND BREAKER FOR USE WITH METAL CUTTING TOOL The present invention concerns a device for deforming and breaking chips of metal-cutting tools with at least one deflecting surface, and its use.

Chip breakers are known which are generally equipped with a chip deflecting plane. But these are frequently unsatisfactory, particularly in special machines which are used for metal cutting. For reasons of economy, not the entire material inside the bore diameter is chipped during the production of large and primarily long bores, but only a very narrow ring duct. The use of the core bit is limited to a great extent by the removal of the chips. The presently known chip rollers and chip breakers are ineffective for a great number of materials, since they can frequently not prevent the forming of long, greatly twisted chips, which can lead to clogging of the ring duct provided for the removal of the chips and thus to breakage of the tool. The use of the core bit is thus only possible to a limited extent.

The object of the present invention is to eliminate this inconvenience. The device according to the invention is characterized by the fact that the chip deflecting surface is constituted by a series of planes which may also include at least one curved surface.

The invention will be described below on the basis of the accompanying drawings wherein.

Figure 1:
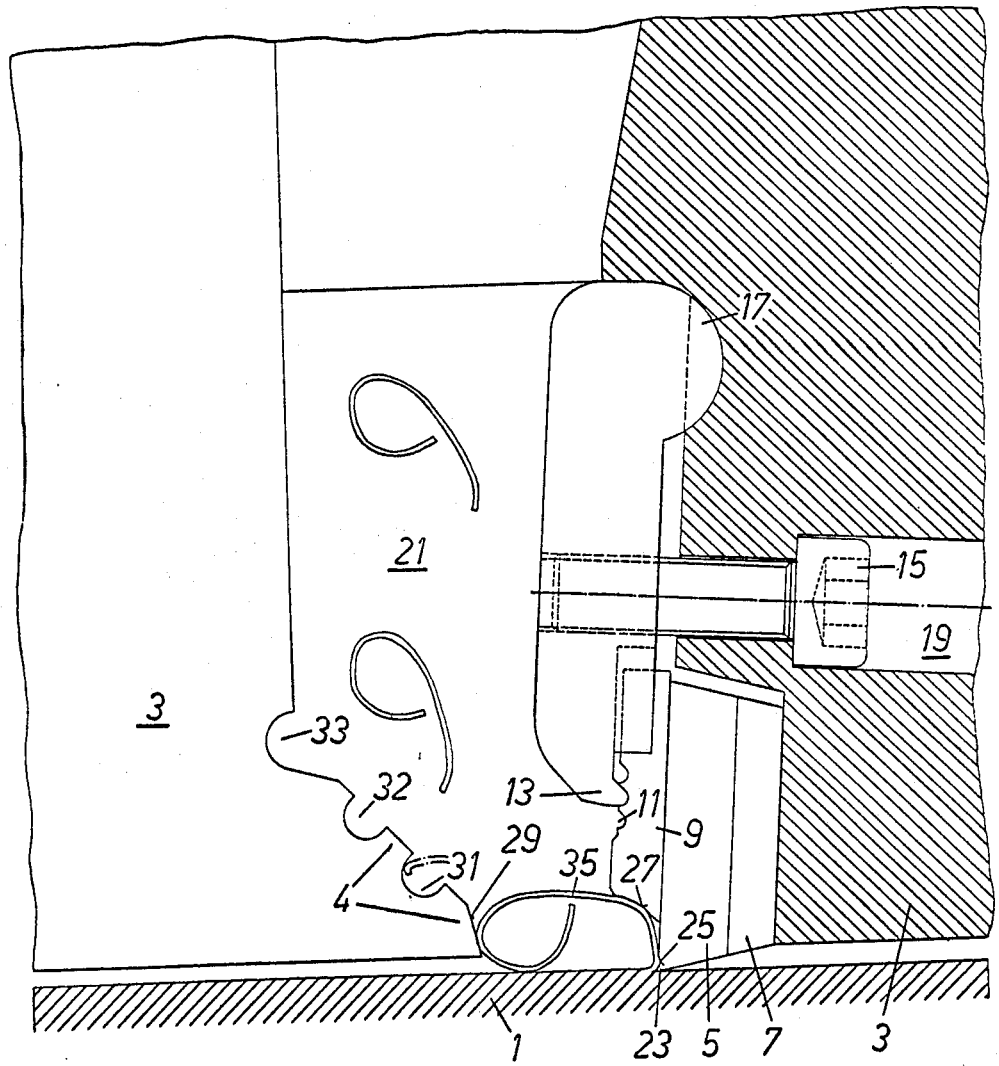
FIG. 1 shows a part of a meridian section through a core bit with a metal-cutting tool and chip deflecting surface.

In FIG. 1 can be seen a part of a workpiece 1 which is machined by means of a core bit 3. The core bit is equipped with a cutting plate 5 which is held by a clip 13 by way of a chip breaker 9 and a base plate 7. The chip 13 itself is held by a hollow screw 15 arranged in a passageway 19, the head of the clip engaging holding grooves 11 of the chip breaker 9, while the clip abutment 17 bears on the core bit 3. A chip discharge duct 21 is provided in the core bit 3 for the removal of the chips.

The cutting plate 5 has a cutting edge 23, followed by a fillet 25. In addition to the chip deflecting surface 27 provided on the chip breaker 9 an additional chip deflecting surface 29 is provided on the opposite side on the core bit 3 at a region 4 located forwardly of the cutting point 23 in the direction of travel of the cutting plate 5. In this part 4 of the core bit 3 are also arranged above the chip deflecting surface 29 three chip breaker grooves 31, 32 and 33. The formation and breaking of chips 35 are represented in FIG. 1.

When the core piece 1 is drilled, the cutting edge 23 engages the workpiece in the represented manner, corresponding to the respective feed, and lifts the chip 35 from the latter. Its free front end arrives at the top of the chip deflecting surface 27 of the chip breaker 9, which surface, which will be described more fully below, is composed either of at least three plane surfaces, or which has a curved surface with or without an additional deflecting plane. Here the chip 35 is bent approximately by 90° in the represented manner. During the drilling it may also arrive, for example, in the position represented by a broken line, and if necessary it can be pushed into a second groove 32 or 33 arranged above the groove 31. Here the leading end of the chip impinges, the impact producing in the chip a compressive stress so that this chip will normally break on the chip deflecting surface 27 or in the region of the fillet 25.

When the drilling operation becomes stabilized, the front end of the chip arrives on the deflecting surface 29 of the core bit 3, is deflected in the represented manner toward the workpiece 1, and subsequently broken in the above mentioned manner by compressive stress. In this manner relative small, compact chips are formed corresponding to the distance between the two chip deflecting surfaces 27 and 29, which can be easily flushed out from the core bit through the discharge duct 21. The removal of the broken chips is effected by means of the coolant current passing by, which carries along the chips.

The chip deflecting surface 27 as well as the deflecting surface 29 are of particular importance. These surfaces 27 and 29 can be composed either of at least three planes or they can be curved, either developable, for example, cylindrical or conical, or not developable, particularly spherical. Combinations of curved with plane surfaces are also possible. The dimensioning and inclination of the planes and surfaces respectively with regard to the cutting plate 5 depends on the material, and the operation and must be determined from case to case.

Figure 2:
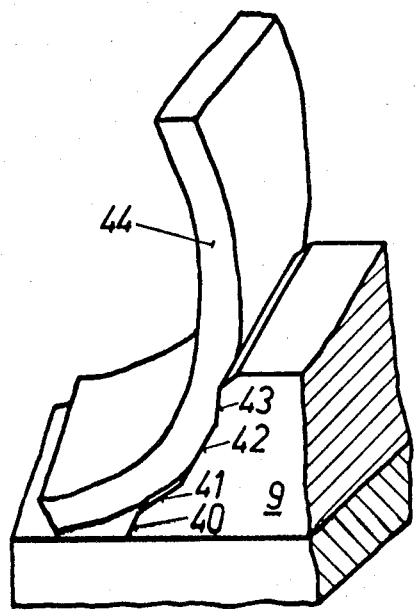
FIG. 2 shows on an enlarged scale a part of a chip breaker in a perspective view, the deflecting surface of which is composed of four planes in series.
Figure 3:
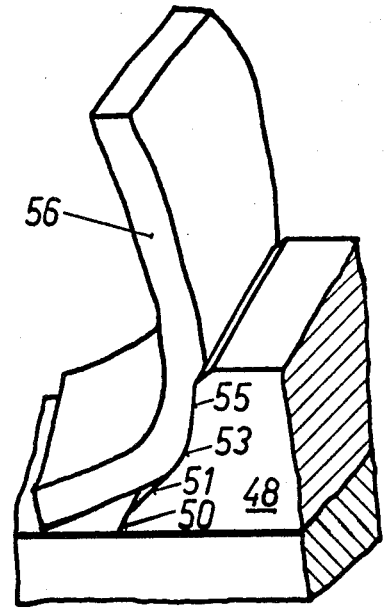
FIG. 3 shows a variant of chip breaker according to FIG. 2 which includes a curved developable chip deflecting surface located in the series of plane surfaces.
Figure 4:
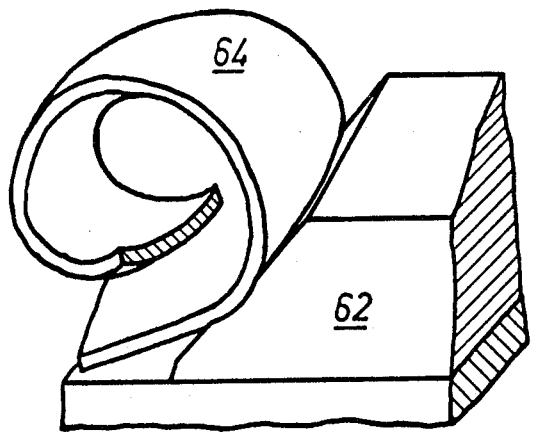
FIG. 4 shows another variant of a chip breaker according to FIG. 2 with a spherical deflecting surface located between two plane surfaces.

FIGS. 2 to 4 show a few variants of the chip breaker. The chip breaker 9 according to FIG. 2 has four chip deflecting planes 40, 41, 42 and 43. The chip 44 deflected on these planes is likewise represented schematically.

FIG. 3 shows a chip breaker 48 which has two chip deflecting planes 50 and 51 facing the workpiece, followed by a cylindrical deflecting part 53. The latter is followed again by a chip deflecting plane 55. A chip 56 is deflected on these surfaces. The cylinder axis of the surface 53 is here represented parallel to the workpiece. But it can also have any desired position. FIG. 4 shows a chip breaker where at least a part of the deflecting surface is not developable. In the represented example, the deflecting surface is spherical. A chip 64 is deflected on this surface.

These variation possibilities described with regard to the deflecting surface 27 apply naturally also to the deflecting surface 29 and, if necessary, also to the shape of the chip breaker grooves 31 to 33.

In order to keep the wear caused by the friction between chip and deflecting surfaces 27, 29, 31, 32, 33 and by the impingement of the chip end on the deflecting surfaces within admissible limits, the chip breaker 9 is made of sintered-hard metal, or the chip deflecting surfaces 27, 29, 31, 32, 33 can be equipped with hard metal plates or hard metal can be applied by flame- or plasma spraying.

The invention permits not only the use of the core bits for all metallic materials, it also permits a reduction of the chip return duct to a fraction of the size necessary in conventional chip breakers, and thus a reduction of the material volume to be chipped to a fraction of the volume customary in conventional core drilling methods, which results in a reduction of the driving power on the machine tool.

I claim:

1. A combined cutting tool and chip breaker structure comprising a core bit, a cutting plate including a cutting edge and which is secured to said core bit in cutting relation to the work surface for cutting chips from the latter, a first chip breaker mounted on said cutting plate and which includes a chip deflecting surface for deflecting and bending the leading end of the chip as it is being cut, and a second chip breaker including a chip deflecting surface secured to said core bit forwardly of said cutting plate and first chip breaker in the feed direction of said cutting plate for effecting further deflection, bending and breakage of the chips, the space between said first and second chip breakers communicating with a discharge duct for the broken off chips.

2. A combined cutting tool and chip breaker structure as defined in claim 1 wherein said second chip breaker is constituted by a series of plane surfaces separated by grooves for catching the leading end of the bent chip.

3. A combined cutting tool and chip breaker structure as defined in claim 1 wherein said first chip breaker is constituted by a series of plane surface elements arranged one after another and at an angle to each other.

4. A combined cutting tool and chip breaker structure as defined in claim 1 wherein said first chip breaker includes a developable curved surface element such as one having a partial cylindrial configuration.

5. A combined cutting tool and chip breaker structure as defined in claim 1 wherein said first chip breaker includes a non-developable curved surface element such as one having a partial spherical configuration.

* * * * *